United States Patent [19]
Burgyan

[11] 4,190,819
[45] Feb. 26, 1980

[54] MOTOR VEHICLE AUDIO INFORMATION SYSTEM

[75] Inventor: Lajos Burgyan, Mountain View, Calif.

[73] Assignee: Michael J. Femal, Arlington Heights, Ill. ; a part interest

[21] Appl. No.: 763,883

[22] Filed: Jan. 31, 1977

[51] Int. Cl.[2] .......................... G08G 1/12; G11B 5/00; G06F 15/50

[52] U.S. Cl. ............................... 340/23; 179/100.1 C; 360/12; 364/449; 364/460

[58] Field of Search ................. 340/22, 23, 24; 35/11; 360/4, 6, 12; 179/100.1 C; 364/449, 436, 460, 424

[56] References Cited

U.S. PATENT DOCUMENTS

| | | | |
|---|---|---|---|
| 2,928,186 | 3/1960 | Hirsch | 179/100.1 C |
| 2,965,720 | 12/1960 | Bumstead | 340/23 |
| 3,575,575 | 4/1971 | Kean | 179/100.1 C |
| 3,711,653 | 1/1973 | Barbier | 340/23 |
| 3,824,534 | 7/1974 | Straumsnes | 340/24 |
| 3,845,289 | 10/1974 | French | 340/24 |
| 3,956,010 | 5/1976 | Patterson | 179/100.1 C |

*Primary Examiner*—Donald J. Yusko
*Assistant Examiner*—James J. Groody
*Attorney, Agent, or Firm*—Michael J. Femal

[57] ABSTRACT

A motor vehicle information system having a programmable automotive tape recorder that can automatically deliver sequential prerecorded messages concerning road information and the like at predetermined intervals. An electromechanical adaptor connected to the odometer system of the vehicle provides pulses that are proportional to the distance traveled and these pulses are fed into a microprocessor which performs arithmetic and logic functions to drive a tape recorder with prerecorded messages. The system permits the distance data for programming the microprocessor and the related sequential messages to be stored directly on the tape such as a prerecorded casesette or for the distance data to be stored in the memory of the microprocessor with the sequential messages on the tape only.

7 Claims, 6 Drawing Figures

MOTOR VEHICLE AUDIO INFORMATION SYSTEM

BACKGROUND OF THE INVENTION

This invention relates to an information system for motor vehicles and is more particularly concerned with the use of a microprocessor in conjunction with a tape recorder that will generate sequential prerecorded messages which are related to the distance traveled so that pertinent road information is given to the driver of a motor vehicle as he proceeds along his route to a final destination.

Previously, such systems had utilized a generally complex tape recorder, either using several tracks, or using control frequencies beyond the audio range, both of which complicated the amplifier and the tape advance mechanism required to deliver the prerecorded messages. Furthermore, these systems often required complicated reduction drives to deliver the proper signal to the complex tape recorder systems.

The prior art systems also had built-in deficiencies such as a limit on the time of the prerecorded message. Because of the brevity of the message, this often lead to a cryptic explanation as to where the driver of the motor vehicle should turn off, beware of a warning or receive general guidance, etc. Next, the tape formats of these audio-information systems do not lend themselves to formats where the data concerning the distance traveled is stored on the tape itself rather than in a memory within the calculator section of the system. Still others were inheritantly slow and sluggish which resulted in unreliable performance without a means for correcting the deliver of an early or late prerecorded message.

Practically, all of these older type of audio information systems required a number of components that were undesirably large for in the dash applications, and it was in effort to provide an audio information system with better operating capability and with a simplier and less costly circuit components as well as a simplier tape format that the present invention came about.

SUMMARY OF THE INVENTION

With this invention, the foregoing problems are substantially solved. The present invention is ideally suited to the rent-a-car industry where fleets of their cars at major airports are leased by out-of-town visitors who may not be familiar with the surrounding area. The rent-a-car company hands the lessee a prerecorded cassette containing distance data and prerecorded messages for directing the motorist to a particular destination within the surrounding area. Also, this audio-information system has applications for motor club companies in which a member may pick up a series of prerecorded cassettes which will give him traveling information as he proceeds along on his trip without referring to cumbersome roadmaps and the like.

In accordance with the present invention, an audio-information system is provided in which signals proportional to distance traveled are applied to a microprocessor which performs all the required arithmetic and logic functions in order to produce an output signal that drives a tape recorder with prerecorded messages thereon. An electromechanical adaptor connected in series with the odometer of the motor vehicle produces an output signal which is fed into a pulse shaper providing an uniform output pulse. The uniform output pulse is then fed into a prescaler which produces a predetermined number of output pulses for a predetermined number of input pulses. The predetermined number of output pulses are a function of distance traveled and these pulses are then fed into a microprocessor which may have its memory set as to a particular distance for comparison with these pulses by either a keyboard or a decoder via distance data stored on a prerecorded tape. When the predetermined number of input pulses into the microprocessor are equal to or greater than the current distance data in the memory then an output signal from the microprocessor turns on the tape recorder and a sequential prerecorded message is delivered giving the required road information. After the message ends a recordmark on the tape is sensed by a recordmark sensor circuit and fed to the microprocessor which in turn produces an output pulse that stops the tape recorder until the next destination point is arrived at.

DESCRIPTION OF THE DRAWINGS

Further objects and features of the invention will be readily apparent to those skilled in the art from the following specification and from the appended drawings illustrating certain preferred embodiments in which.

DESCRIPTION OF THE PREFERRED EMBODIMENT

Figure 1:
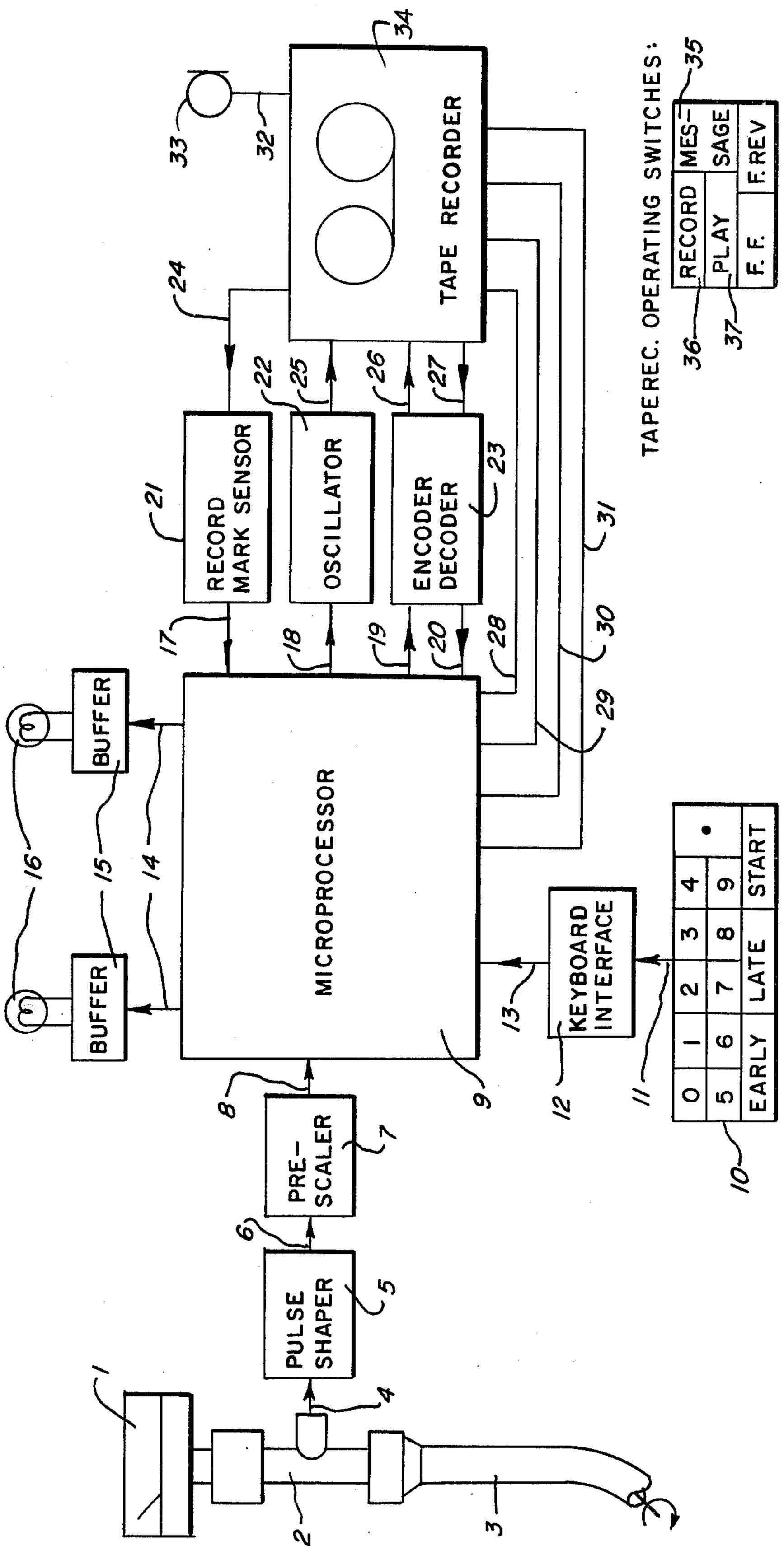
FIG. 1 is a block diagram showing the basic system concept.

Referring to FIG. 1, an audio-information system is shown in which an odometer 1 of a motor vehicle is connected in series with an electromechanical adaptor 2 which in turn is connected to the flexible axes of a spiral cable 3 from the drive shaft or the like of the motor vehicle. The electromechanical adaptor 2 such as the one used in spacecom model 44020 miles per gallon meter, produces one pulse per revolution. These pulses are proportional to the rpm of the spiral 3. The output for the electromechanical adaptor 2 is then fed into a pulse shaper 5 which provides uniform output pulses 6. The uniform output pulses 6 of the pulse shaper 5 are then fed into a prescaler 7. The prescaler 7 is a divider producing a predetermined number of pulses at its output, for a predetermined number of pulses at its input. An output pulse train 8 which is proportional to the distance traveled is then fed into a microprocessor 9 which can either be a general purpose microprocessor such as Fairchild's F-8 or some other microprocessor of suitable characteristics. The microprocessor 9 performs all the required arithmetic and logic functions and produces output pulses to drive a tape recorder to be described in detail later. The microprocessor 9 has a keyboard 10 that serves the purpose of entering distance data into the microprocessor's memory. The keyboard 10 not only provides for data entry into the microprocessor 9 but also provides for control inputs such as "EARLY", "LATE", and "START" signals.

An output 11 of keyboard matrix is fed into a keyboard interface 12 which provides appropriate formating of the distance data entered through the keyboard into the microprocessor 9. However, the keyboard interface 12 may not be required in all applications depending upon the type of microprocessor used. The keyboard interface 12 has a serial or parallel data entry output signal 13 which is fed into the microprocessor 9.

The microprocessor 9 has logical "YES" or "N0" outputs 14 to drive control lights. The logical outputs 14 are connected to buffers 15 which drive "ENTER DATA" and "RECORD MESSAGE" display devices 16 (control lights). The display devices 16 may be ordinary light bulbs, neon bulb or LED's, etc.

The microprocessor 9 receives a logic output 17 from a recordmark sensor 21. The recordmark sensor 21 receives a tone signal 24 of a predetermined frequency at its input from the tape recorder 34 playback amplifier (not shown). This tone is fed through a bandpass amplifier and rectified. The rectified d.c. level is fed into a Schmitt Trigger which produces a predetermined logical level for the logic output signal 17 of the recordmark sensor 21 only if the tone 24 is of a predetermined frequency and amplitude as is well know in the art.

The microprocessor 9 has a logical output signal 18 which is fed into a recordmark oscillator 22. The recordmark oscillator 22 is a gated sign wave oscillator for a recordmark recording on the tape of the tape recorder 34. Gating of the oscillator 22 is accomplished by the microprocessor 9 via a logic output signal 18. The frequency of this oscillator 22 is the same as the center frequency of the bandpass amplifier within the recordmark sensor 21.

Figure 2A:
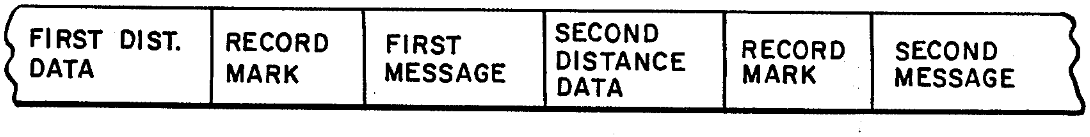
FIG. 2A shows one embodiment of the tape format in which the distance data is stored on a prerecorded tape cassette or the like along with the recordmark and the sequential messages.

The microprocessor 9 has a serial data output signal 19. The distance data entered from the keyboard 10 is transferred from parallel to serial mode by the microprocessor 9 if the data at 13 is parallel. Note however, this may be accomplished by an encoder/decoder 23 if it is preferable. In this case the data output signal 19 would be parallel data. The microprocessor 9 also has a serial data input signal 20 from the encoder/decoder 23. Note that data input signal 20 may be a parallel data input if the serial to parallel conversion is accomplished by encoder/decoder 23. The encoder/decoder 23 produces a serial data stream carried by appropriate modulation for an output signal 26, from the serial or parallel data provided by the microprocessor 9 via output signal or line 19. The modulated signal 26 is such that it can be directly recorded by a general purpose audio-tape recorder such as 34 so that a prerecorded cassette tape as shown in FIG. 2A may carry the distance data thereon. The modulated output signal 26 is fed directly to the recording amplifier of the tape recorder 34. The other function of the encoder/decoder 23 is to produce a serial or parallel data stream (upon playback) at its output to provide the data input signal 20 for the microprocessor 9 by means of demodulation. Input signal 27 for the encoder/decoder 23 is a serial output signal from the output of the playback amplifier in tape recorder 34.

Referring back to oscillator 22 the output signal 25 is a sine wave output to the input of the recording amplifier of tape recorder 34.

The microprocessor 9 has a logic line 28 connected between the tape recorder 34 and the microprocessor 9 in order to detect the "ON" or "OFF" position of a microphone 33 of the remote switch type having a "MESSAGE RECORD" mode and in order to detect "TURN MOTOR ON" and "OFF" in the message play mode. Line 29 between microprocessor 9 and tape recorder 34 is a logic line to monitor the state of the "MESSAGE" pushbutton 35. Line 30 is a logic line to monitor the state of "RECORD" pushbutton 36 of the tape recorded operating switches. Line 31 is a logic line to monitor the state of "PLAY" pushbutton 37 of the tape recorder operating switches.

The operating sequence of the audio-information systems is as follows:

1. Prior to the journey, the driver chooses a reference location ($L_R$) on the map from where he will begin to calculate distances.

2. Selects all the $L_1$; $L_2$ . . . $L_N$ locations where he desires to receive a prerecorded message.

3. Enters the first $L_1-L_R$ distance into the microprocessor memory through the keyboard 10.

4. Records the first message, i.e., the one he wants to receive just before arriving to location $L_1$.

5. Automatically the recordmark is entered on the tape.

6. Enters the second ($L_2-L_1$) distance and records the second message, and so on.

Figure 4A:
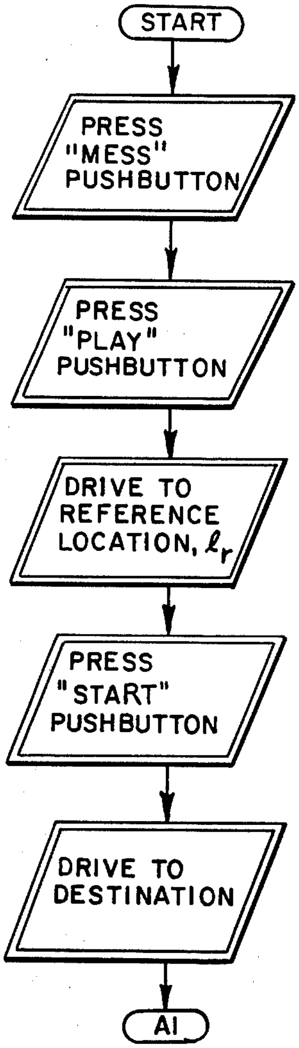
FIG. 4A shows the functions to be performed by the operator.

7. Arriving to the referenced location, $L_R$, the operator starts the mileage measurement by pressing the "MESSAGE" pushbutton, pressing the "PLAY" pushbutton and by pressing "START" pushbutton and then driving to the destination as shown in FIG. 4A. While driving to the destination, the sequential prerecorded messages will be automatically delivered as they become actual at the proper location.

8. If during a long drive or due to the limited accuracy of a map, some error happens to accumulate, correction can be performed by pressing "EARLY" or "LATE" pushbuttons that initiate the addition or subtraction of increment amounts of distance to or from the next distance ($L_N$). This distance correction can be made as many times as may be necessary.

Figure 2B:
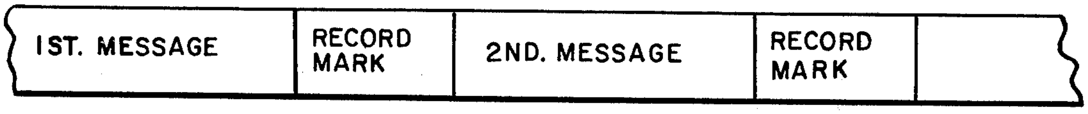
FIG. 2B shows another tape format where only the sequential messages and recordmarks are on the tape and the distance data is entered into the microprocessor by a keyboard.

As previously mentioned, the tape format is shown in FIGS. 2A and 2B. FIG. 2A, a highly preferred embodiment of the tape format of the present invention, represents a prerecorded tape such as a cassette or the like in which the distance data is stored directly thereon. First, the distance data which is fed into the microprocessor memory is recorded on the tape and that is immediately followed by a recordmark to stop the tape recorder until the required distance is traveled. Next comes the first message, associated with the first distance data followed by a second distance data to memory of the microprocessor and subsequent recordmark to stop the tape. Next, the second message is recorded on the tape and this format repeats itself until the last message on the tape is reached.

The tape format shown in FIG. 2A may be modified to include all of the $L_1$, $L_2$ . . . $L_N$ locations in a single distance data input at the beginning of the tape format to program the memory of the microprocessor 9. The single distance data input would then be followed by a similar tape format as shown in FIG. 2B.

FIG. 2B shows another tape format in which each discrete message is preceded and followed by a recordmark. The distance data is entered into the memory of the microprocessor by the keyboard 10 instead of utilizing prerecorded tapes with distance data already on them like FIG. 2A. However, one important advantage inherent in both of the above mentioned tape formats is that the messages can be of any duration unlike previous prior art audio-information systems.

The recordmark in both versions of the tape formats is the previously mentioned audio signal 24 of a single tone, recorded in a tape-length of approximately three to five inches, and it serves the following dual purposes:

(a) separates the prerecorded messages from one another and stops the tape recorder automatically after sensing the recordmark; and (b) since the recordmark is audible and precedes every message, it calls the drivers attention to the upcoming prerecorded message, that is about to come.

Figure 3:
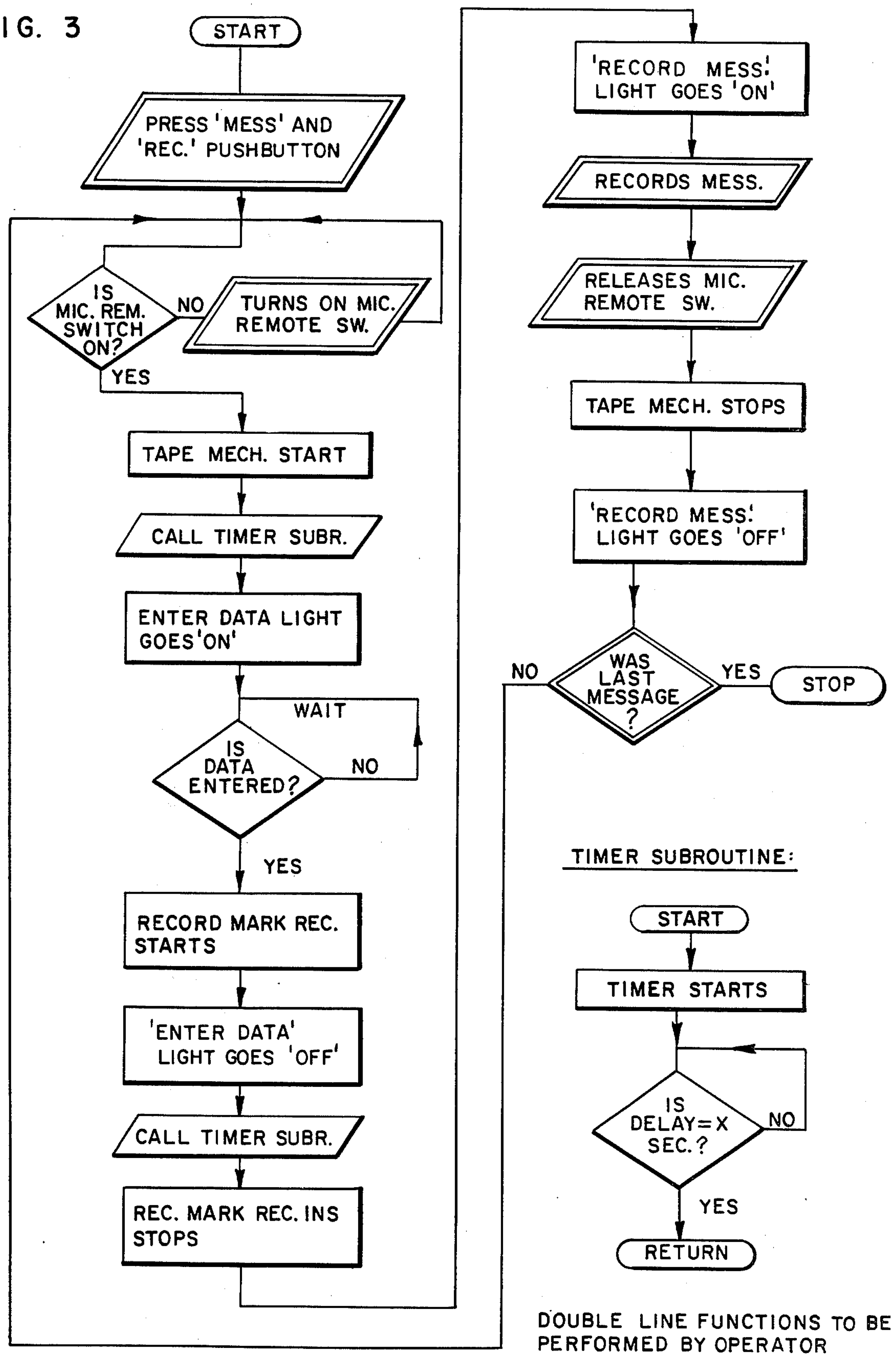
FIG. 3 is a flowchart of the message recording process, including logic functions to be performed by the operator.

FIG. 3 shows the flowchart of the message recording process including the function to be performed by the operator which are within double lines. After the operator has loaded the cassette into the tape recorder 34, the operator presses first the "MESSAGE" pushbutton 35 and then the "RECORD" pushbutton 36. Since the operator has just started the message recording process, the microphone remote switch is in the "OFF" position. Therefore, there is a logic "NO" condition and the tape recorder must be started by turning on the microphone remote switch. Simultaneously the remote switch being turned on a call timer subroutine is triggered and then the enter data light 16 goes on. As soon as the data is entered the recordmark as shown in FIG. 2A starts and the enter data light goes off. The recordmark recording continues for a predetermined duration of the call timer subroutine before it stops and the "RECORD MESSAGE" light 16 goes on. Then the operator using the remote microphone records information which a driver might need or wants to know about the area that he is about to approach, such as exits, road information, lanes, general guidance, etc. The operator then releases the remote microphone switch and the tape recorder stops and the record message light 16 goes off. If that is the last message to be recorded operator has finished prerecording the cassette. If not, the process starts all over again with the second logic box entitled "IS MICROPHONE REMOTE SWITCH ON?".

When all the messages are recorded, the operator rewinds the tape to the first distance data and the playback process can begin. This system flowchart can be used with the tape format of either FIG. 2A or FIG. 2B in which the distance data is either stored directly on the tape or fed into the memory of the microprocessor via keyboard 10, respectively.

Figure 4B:
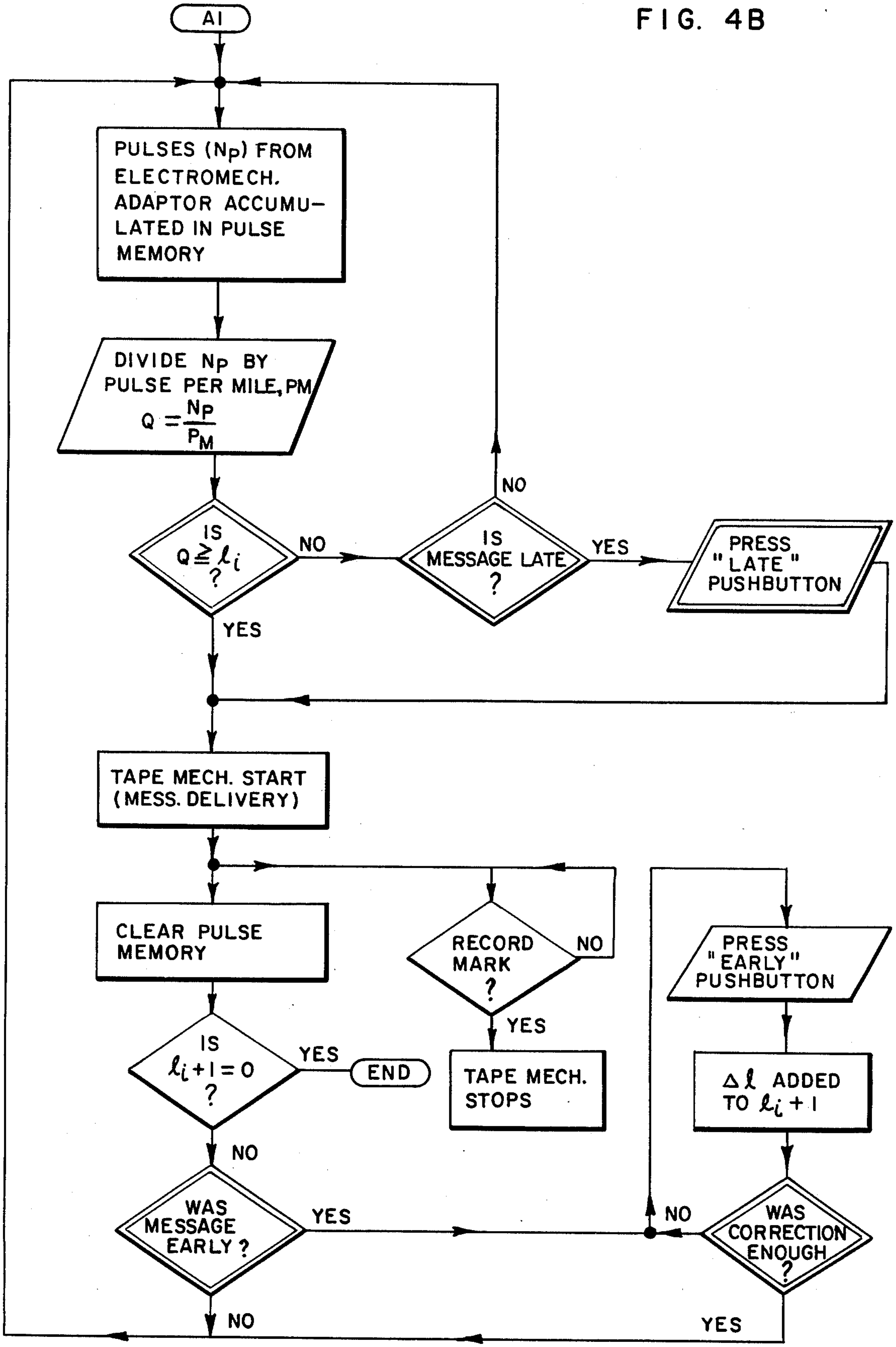
FIG. 4B is a flow chart of the playback (message delivery) process, including logic functions to be performed by the operator.

The flowchart of the playback process is shown in FIGS. 4A and 4B and is applicable to both tape formats as shown in FIGS. 2A and 2B. FIG. 4A shows five logic functions to be performed by the operator. The playback process begins with the pressing of the "MESSAGE" button 35 and "PLAY" button 37. Then the operator of the motor vehicle drives to the reference location ($L_R$) and starts the distance measurement from $L_R$ by pushing the "START" pushbutton. While driving to the destination pulses will continuously arrive from the electromechanical adaptor 2 to the microprocessor 9. These pulses are proportional to the distance from $L_R$ and they are accumulated in the pulse memory as shown in FIG. 4B. The microprocessor 9 samples the contents of the pulse memory and divides the pulses ($N_P$) from the electromechanical adaptor 2 to accumulate in the pulse memory by pulses per mile ($P_M$) which are the number of revolutions per mile of the odometer-spiral axes. The quotient, Q is the $L_r-1$ distance. That is, the actual distance from the reference location the quotient is compared to $L_i$ the distance in the memory, and if it is equal or greater than, the tape recorder begins to deliver the message. As shown on the flowchart 4B, another series of logical events can also result in a message delivery, even before the condition, quotient is equal to or greater than $L_i$, is met. This occurs only if the driver finds that the message ought to have been delivered already. In this instance, the operator presses "LATE" pushbutton thereby causing the tape recorder to begin to deliver the message immediately. Simultaneously, the pulse memory is cleared and the next $L_i+1$ distance is entered into the microprocessor memory. If $L_i+1$ is not equal to zero, the whole process starts again at A1. If $L_i+1$ is equal to zero the process is stopped because it means that no $L_i+1$ distance was entered to the memory, that is, $L_i$ was the last one.

In case the driver finds that the message was delivered too early, he can press the "EARLY" pushbutton and then add a delta L distance to the next $L_i+1$ distance. If the correction is not enough he can repeat this procedure as many times as it is necessary.

While the message is being delivered, the recordmark on both tape formats is constantly being monitored by feeding the audio output of the tape recorder into a bandpass filter. This amplifier is tuned to the frequency of the recordmark and it feeds a rectifier circuit. This circuit provides a logical "1" only if the recordmark is hit. In this case, the tape mechanism is stopped.

In summary, the messages on the tape format are delivered sequentially as they become actual. Besides providing guidance for the driver, this invention can help to avoid sudden brakings in heavy traffic or dangerous lane changes as the driver approaches an exit or intersection that was just about forgotten. Therefore, this invention can improve the safety of the driver and those around him. Furthermore, the system described in this invention can be attached to any model of vehicle that has a built in odometer. Installation does not require skilled technicans. In addition, rent-a-car and motor clubs can utilize prerecorded cassettes to direct patrons to their points of destination by incorporating the distance data on the tape itself as shown in FIG. 2A. Also, the audio information system permits the operator to feed in the distance data by a keyboard when using the version shown in FIG. 2B for a tape format.

It is understood that the means of the embodiment described above has no limiting character whatsoever and that there may be any desired modifications without exceeding the scope of this invention.

I claim:

1. A compact audio information system for connection to a motor vehicle including a tape recorder for delivering messages in a sequential order at predetermined intervals related to the distance traveled by the motor vehicle, comprising:

means responsive to vehicle movement for generating an output pulse train proportional to the distance traveled by the vehicle; and means connected to an output of the generating means including a pulse memory for accumulating the pulse train, a programmable memory for storing preselected distance data, and means for comparing the accumulated pulse train with the stored distance data for energizing the tape recorder to deliver one of the sequential messages every time the incoming accumulated pulse train in the pulse memory is approximately equal to the addressed distance data in the programmable memory;

means connected to a first output of the energizing means and to an input of the tape recorder and responsive to a signal at the first output of the energizing means for recording a tone signal of a predetermined frequency on the tape;

means for sensing the tone signal connected to an output of the tape recorder and connected to an input of the energizing means whereby the tone signal acts to separate the sequential messages from one another and to stop the playback of the tape recorder when the tone signal is sensed; and wherein the tape includes a format comprising a first distance data, the tone signal, a first message, a second distance data, the tone signal, a second message and so on in that order until the nth message on the tape is reached followed by the tone signal for stopping the playback of the tape recorder.

2. The audio information system of claim 1 further including means for entering the preselected distance data into the programmable memory of the energizing means.

3. The audio information system of claim 2 wherein said entering means is a decoder for receiving distance data stored on the tape and providing a coded output signal for setting the programmable memory.

4. The audio information system of claim 1 further including means actuated by an operator of the motor vehicle for starting the playback of the tape recorder to deliver the current sequential message that is due if the message is late and for clearing the pulse memory for the next accumulated pulse train to be compared with the next stored distance data in the programmable memory.

5. The audio information system of claim 1 further including means actuated by an operator of the motor vehicle for adding an increment of distance to the next distance data stored in the programmable memory if the preceding message was delivered too early.

6. The audio information system of claim 1 wherein the tape has the distance data for setting the programmable memory stored directly on it.

7. A method for delivering prerecorded messages concerning road information and the like at predetermined intervals related to the distance a motor vehicle travels, comprising the steps of:

utilizing a tape recorder in conjunction with an arithmetic and logic functioning microprocessor;

generating pulses that are proportional to the distance traveled by the vehicle;

accumulating the generated pulses in the microprocessor;

programming the microprocessor with preselected distance data related to each of the prerecorded messages;

dividing the accumulated pulses by pulses per a measurement of distance resulting in a quotient;

comparing the quotient with one of the preselected distances stored in the microprocessor to produce an output signal that drives the tape recorder to deliver one of the prerecorded messages related to the compared distance whenever the quotient is approximately equal to the preselected distance; and sensing a recordmark on the tape after each prerecorded message for stopping the playback of the tape recorder until the next quotient is equal to the next preselected distance in the microprocessor, wherein the tape includes a format comprising a first distance data, the recordmark, a first message, a second distance data, the recordmark, a second message and so on in that order until the nth message on the tape is reach followed by the recordmark for stopping the playback of the tape recorder and in which the distance data on the tape programs the microprocessor with its preselected distance data related to each of the prerecorded messages.

* * * * *